Sept. 10, 1940. R. P. MAGNENAT 2,214,505
TABLET MAKING MACHINE
Filed Feb. 2, 1937 7 Sheets-Sheet 1

INVENTOR
René P. Magnenat.
BY H. G. Manning
ATTORNEY

INVENTOR
René P. Magnenat.
BY H. G. Manning
ATTORNEY

Sept. 10, 1940. R. P. MAGNENAT 2,214,505
TABLET MAKING MACHINE
Filed Feb. 2, 1937 7 Sheets-Sheet 5

Fig. 7

INVENTOR
René P. Magnenat.
BY H. G. Manning
ATTORNEY

Sept. 10, 1940.  R. P. MAGNENAT  2,214,505
TABLET MAKING MACHINE
Filed Feb. 2, 1937  7 Sheets-Sheet 7

INVENTOR
Rene P. Magnenat.
BY
H. G. Manning
ATTORNEY

Patented Sept. 10, 1940

2,214,505

UNITED STATES PATENT OFFICE 2,214,505

TABLET MAKING MACHINE

René P. Magnenat, Waterbury, Conn., assignor to The Waterbury Button Company, Waterbury, Conn., a corporation of Connecticut Application February 2, 1937, Serial No. 123,627

21 Claims. (Cl. 18—16)

This invention relates to machines for making solid tablets from powdered materials, and more particularly to a tablet making machine of this nature having an improved die-filling mechanism, a punch mechanism, a tablet ejector, and means for adjusting said punch mechanism and tablet ejector.

Previous machines for producing tablets and like products from powdered material for use in making buttons, insulating washers, blanks requiring further operations, etc., were subject to the disadvantage that the powdered material employed would fly about in the form of dust, and would settle upon the operating parts thereof, particularly on surfaces having exposed lubricant, such as gears, cams and slides. This usually produced abrasion, sticking and injurious strains and fatigue, and therefore, sometimes resulted in breakage and failures.

A further disadvantage of such machines was that the lubricating oil or grease supplied to the various bearings would often creep into the die, and cause discoloration of the tablets, rendering them useless,—and it was impossible to remove such lubricant without completely overhauling the machine.

A still further disadvantage of such prior tablet making machines was that considerable time and labor were required to make the necessary adjustments in the punch and ejector strokes, so that they would properly cooperate to form the desired product. In many instances such adjustments required a complete resetting of the machine for each trial,—an operation which was time and labor consuming and seriously interfered with production. Moreover, the former types of tablet presses were often quite complicated in design and the parts requiring adjustment were relatively inaccessible.

By means of the present invention, the above and other disadvantages have been avoided and a tablet making machine has been provided having a rectangular multiple punch and die holder in which it is possible to compress tablets of a great variety of shapes and sizes. The die cavities may be arranged compactly in a pair of spaced straight rows resulting in rapid production. The parts are readily accessible for quick adjustments and the principal operating parts are effectively sealed from loose powder or lubricant.

One object of the present invention is to provide a machine of the above nature having means for permitting the size and weight of the tablets to be adjusted without disassembling the parts of the machine.

A further object is to provide a machine of the above nature having an improved form of adjustable relatively shockless tablet ejecting mechanism.

Another object is to provide in such a machine, cam and eccentric means driven by a common central source of power for operating the punch-carrying head and the tablet ejector mechanism.

A further object is to provide a machine of the above nature which will be extremely strong and compact, having only a few projecting parts, and provided with means for effectively lubricating the parts subject to the greatest stresses.

A further object is to provide a machine of the above nature having an improved form of hopper for supplying loose powder to the die and an improved pendulum operated powder agitator located in said hopper.

A still further object is to provide a tablet making machine of the above nature which will be relatively simple in construction and inexpensive to manufacture compared to its wide range of uses, easy to manipulate and clean, and very efficient and durable in use.

With these and other objects in view, there have been illustrated on the accompanying drawings several forms in which the invention may conveniently be embodied in practice.

Figure 2:
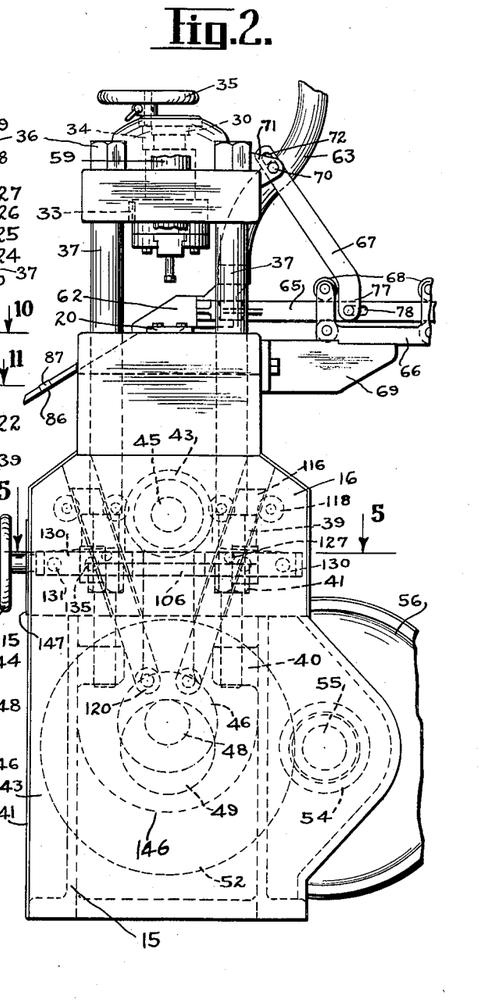
Fig. 2 is a side elevational view of the same.
Figures 11, 12, 13:
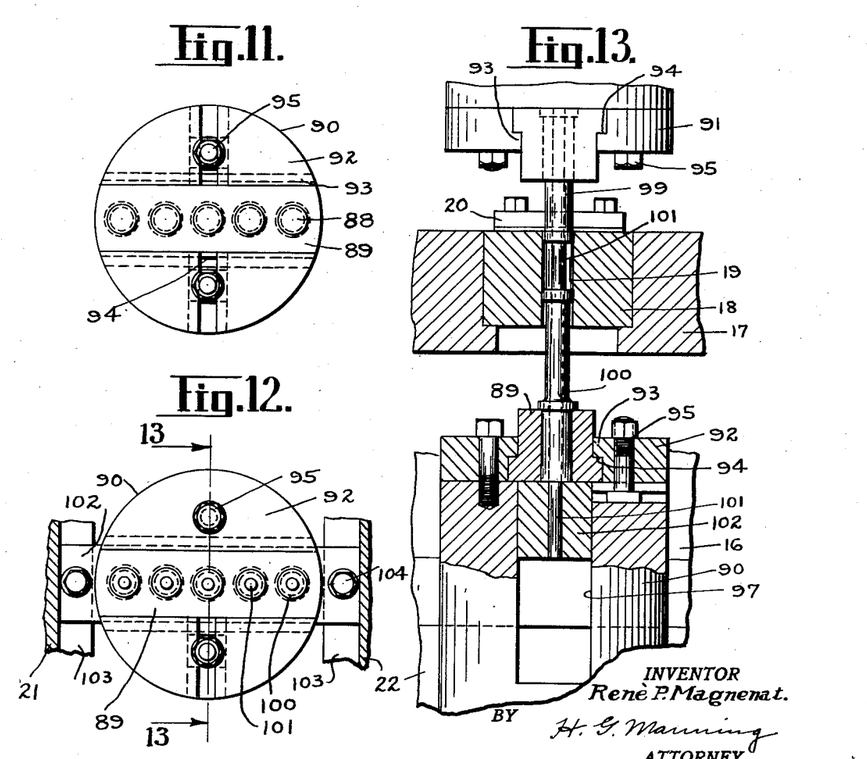
Fig. 11 is an enlarged top plan view of the ejector block and ejector rods taken on the line 11—11 of Fig. 1.
Fig. 12 is a view similar to Fig. 11 of a modified form of the machine which may be used to make hollow or perforated compressed tablets.
Fig. 13 is a vertical fragmentary sectional view taken on the line 13—13 of Fig. 12, showing the different tools required for forming such perforated tablets.

Referring now to the drawings wherein like reference characters denote corresponding parts throughout the several views, the numerals 15 and 16 indicate lower and upper frames, respectively, which frames are secured together as by bolts for supporting the various mechanisms of the machine. The upper portion of the upper frame 16 forms a horizontal supporting table for a die block 17 in which is mounted a die 18, herein shown as having a plurality of tablet forming openings 19, said die 18 being retained in place, as by means of clamp bars 20 (Figs. 2 and 13).

Figure 7:
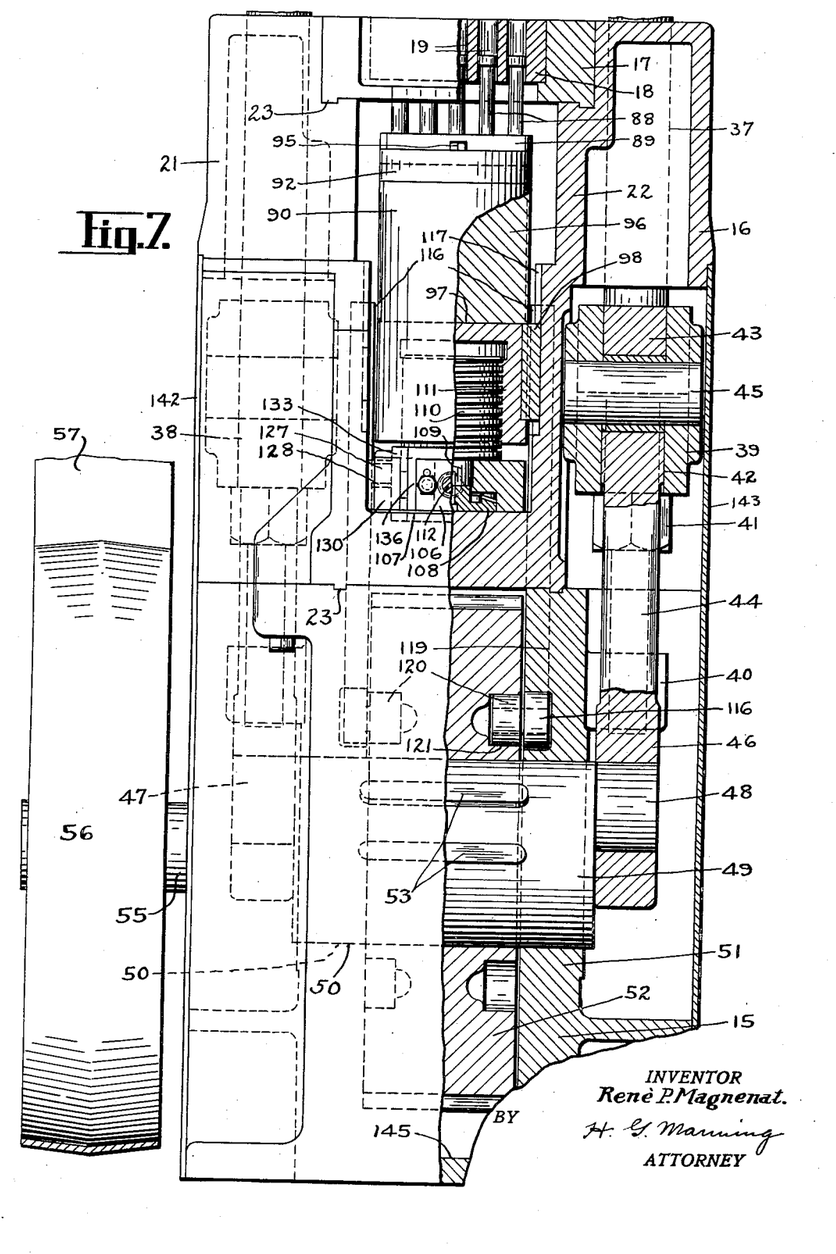
Fig. 7 is an elevational view, partly in section, taken on the broken line 7—7 of Fig. 5.

The die block 17 extends between two upright members 21 and 22 which, as clearly shown in Fig. 7, are interconnected with said block by means of cooperating tongues and grooves 23. A plurality of punches 24 are suspended by a punch block 25, which in turn is secured to a cylindrical ram 26 (see Fig. 4), and said punches 24 are arranged in vertical alinement with the die openings 19 so that when the ram 26 descends, they will enter the dies and compress the loose powdered material disposed therein.

Figure 4:
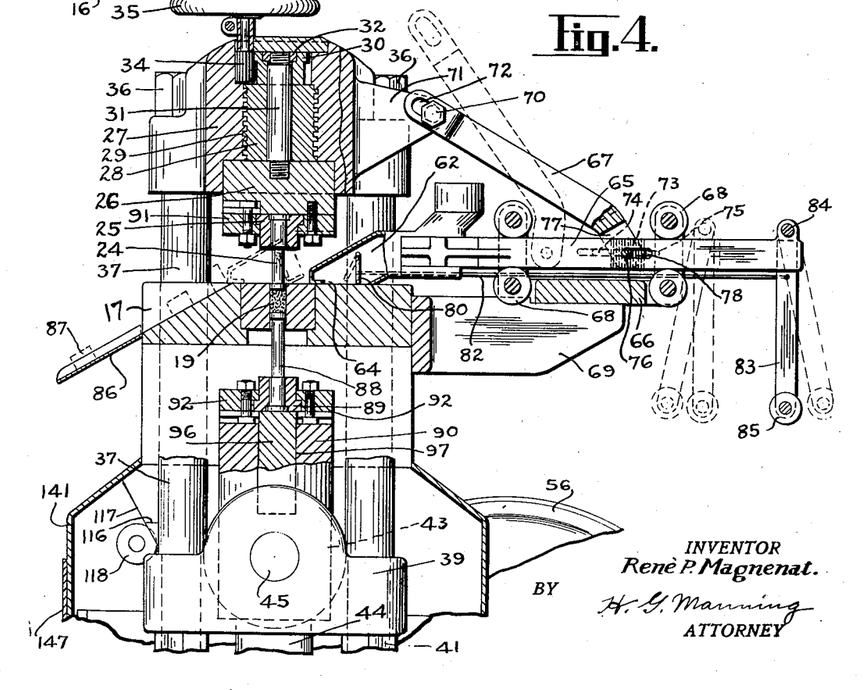
Fig. 4 is an enlarged fragmentary vertical sectional view taken on the line 4—4 of Fig. 3, and illustrating the operation of the powder agitating means and the adjusting mechanism for the punch carrying rim.

The punch ram 26 is movably mounted in a horizontal head 27, and as shown in Fig. 4, may be adjusted vertically therein by means of a threaded sleeve 28, the threads 29 of which cooperate with threads formed in the head 27. The sleeve 28 is connected to a gear 30 at its upper end, and said sleeve loosely surrounds a vertical rod 31 secured at its lower end in the ram 26 and to an upper collar 32 disposed in a recess in the gear 30. As shown in Fig. 2, a key 33 is provided between the horizontal head 27 and the ram 26 to retain the latter against rotative movement. In order to rotate the gear 30, provision is made of a pinion 34 rotatable by a hand wheel 35, said pinion 34 being in mesh with the gear 30 to rotate the same and with it the sleeve 28 to vertically adjust the ram 26 and the punches 24 with respect to the die 18.

In order to vertically reciprocate the horizontal head 27 and the ram 26, said head 27 is connected as by means of nuts 36 (see Fig. 4) to a plurality of vertical tie rods 37, one of which is disposed at each corner of the head, and which extend downwardly therefrom in two pairs to a point below the upper frame 16. The tie rods 37 pass through the ends of a pair of laterally spaced cross-beams 38 and 39, and then into a pair of bearing and guiding lugs 40, respectively, formed on the lower frame 15. The tie rods 37 are retained in connection with the cross-beams 38 and 39 by means of nuts 41 located beneath said cross-beams (see Fig. 7). Each cross-beam 38 and 39 has a slotted opening 42 formed in its center portion wherein is disposed one end 43 of a pair of downwardly extending crank-links 44 which are rotatably connected to the cross-beams 38, 39 by pivot pins 45. The crank links 44 are rotatively mounted at their lower ends 46 upon short eccentric pins 47 and 48 extending from opposite ends of a horizontal main shaft 49 which is journaled in bearings 50, 51 in the lower frame 15. By means of this construction, the crank-links 44 will cause a reciprocating action to be imparted to the cross-beams 38 and 39, the four tie-rods 37, the cross-head 27 and the punches 24.

Figure 6:
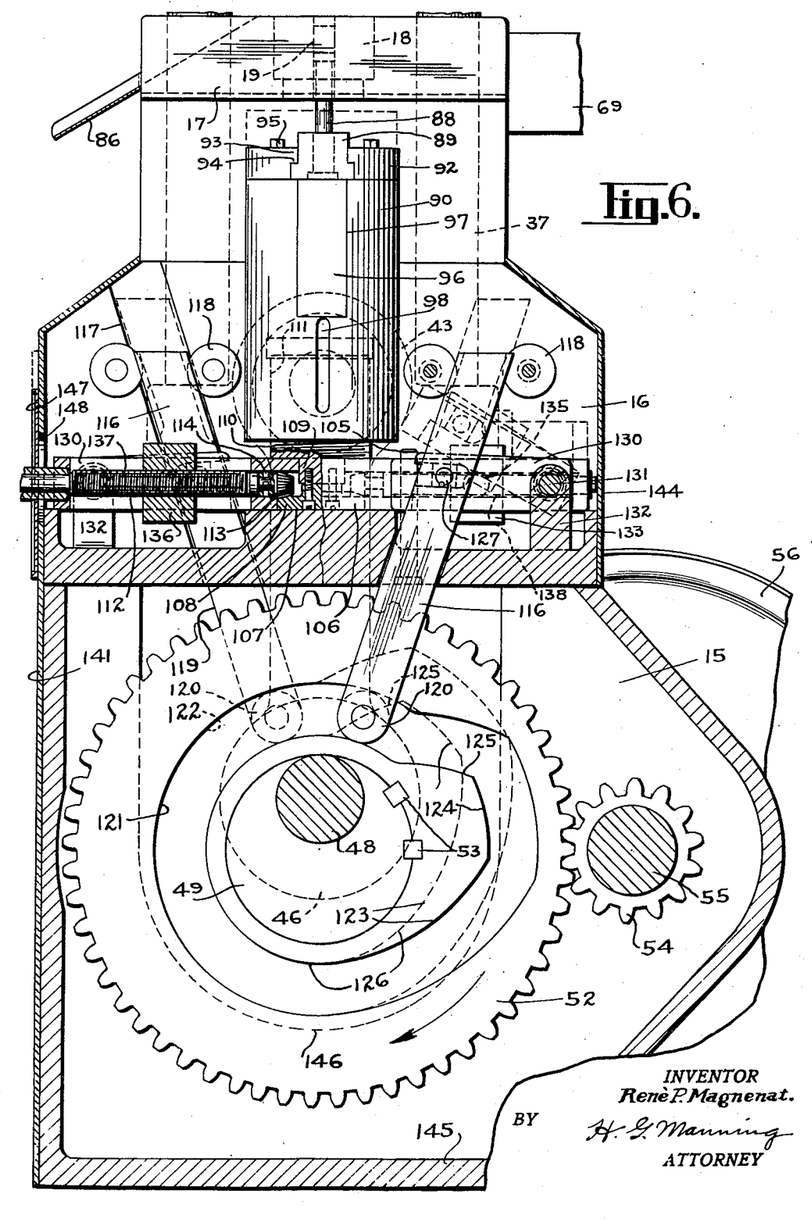
Fig. 6 is a vertical sectional view taken on the broken line 6—6 of Fig. 5, and illustrating the operation of the ejector mechanism.

The main shaft 49 is adapted to be rotated by a large drive gear 52 (Fig. 6) which is suitably keyed to the shaft by keys 53, and is disposed between the bearings 50 and 51 (see Fig. 7). As shown in Fig. 6, the gear 52 meshes with a pinion 54 mounted on a horizontal cross-shaft 55, which extends out of the frame 15 and has a pulley 56 secured thereon. The pulley 56 may be suitably driven by means of a belt 57 (Fig. 1) from any desired source of power, such as an overhead countershaft receiving power from a motor, not shown.

In order to assist the main shaft 49 in raising the head 27 at each upward stroke of the links 44 and tie-rods 37, provision is made of two coiled compression springs 58 (see Fig. 1), the lower ends of said springs engaging against the upper surface of the upper frame 16, and the upper ends pressing against the upper ends of two flanged tubular inverted casings 59, respectively, and secured to the horizontal head 27. Two pairs of air-tight sleeves 60 and 61, which telescopes within each other, are employed to cover the lower parts of the springs 58 and serve to prevent ingress of powder or dust into the coiled springs 58.

*Die-filling mechanism*

Figure 3:
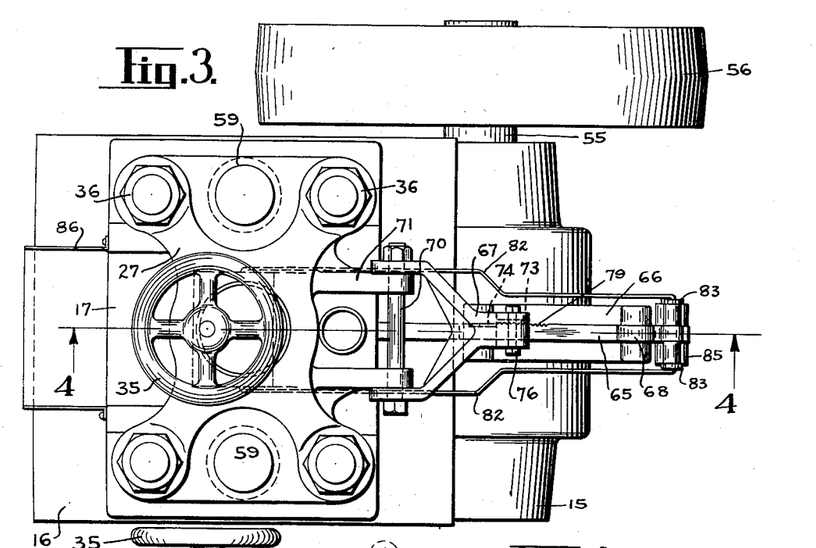
Fig. 3 is a top plan view of the same.

The mechanism whereby the die openings 19 may be positively filled with powdered material, and the formed pellets or tablets intermittently removed from the upper face of the die block 17 after they have been ejected from the dies as hereinafter described, is most clearly illustrated in Figs. 2 and 4. This mechanism includes a hopper 62 which is supplied with powder by gravity through a flexible tube 63 (Fig. 2) from any desirable source of supply, such as a large overhead magazine or container (not shown). The hopper 62 is arranged to reciprocate across the upper surface of the die block 17 between the strokes of the punch permitting the loose powdered material to fall through the opening 64 in the bottom of the hopper into the die openings 19. Intermittent sliding movement is imparted to the hopper 62 by means of a horizontal connecting bar 65 (see Figs. 2 and 4), which extends rearwardly and is connected with the hopper 62. The bar 65 is guided in a suitable bracket 66, and is joined by means of an upwardly inclined bifurcated link 67 to the head 27. The bar 65 rides on and between two pairs of rollers 68, 68, and the bracket 66 is rigidly supported on the upper machine frame 16 by horizontal webs 69. The upper end of the bifurcated link 67 is loosely connected to a bolt 70 which extends across a pair of spaced apart arms 71 on the head 27, and said bolt 70 passes through slotted elongated openings 72 in the ends of said link, whereby back-lash is provided for a purpose to be hereinafter described. The inclined link 67 is pivotally joined with the hopper bar 65 by means of a plate 73 (Figs. 3 and 4), having a tongue 74 extending from one side thereof and adapted to enter a slot 75 formed in the bar 65 and extending lengthwise thereof. The bifurcated link 67 has a pair of bottom legs 77 mounted on a cross-bolt 76, passing through a horizontal slot 78 in the bar 65, and said bolt 76 clamps the plate 73 to said bar 65. The tongue 74, the plate 73, and the adjacent side of the bar 65 are corrugated at 79 (see Fig. 3) to prevent relative slippage of these parts, and the slot 78 permits adjustment in the stroke of the hopper 62. A downwardly inclined sheet metal chute 86 is preferably secured at the front of the die block 17 to guide the pellets 87 after they have been pushed off the die 18 by the hopper 62.

Figure 1:
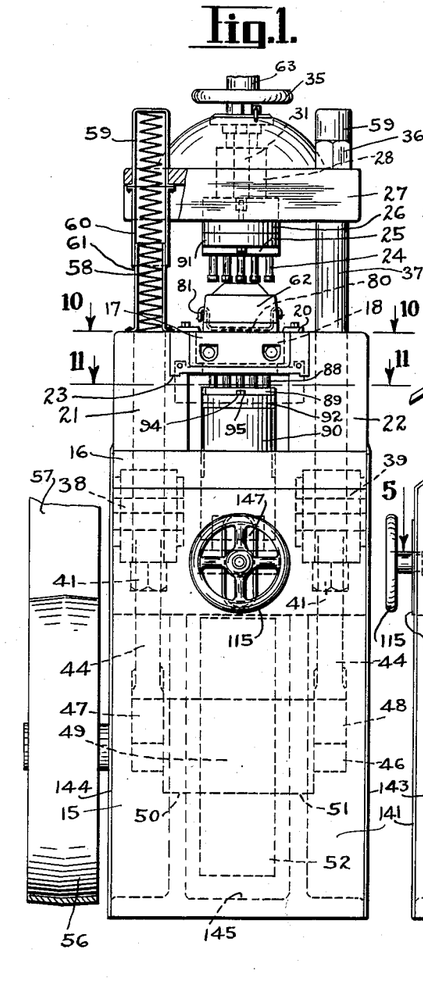
Fig. 1 is a front elevational view of the improved tablet-pressing machine.

In order to insure that the die openings 19 are completely filled before the punches 24 descend, provision is made of an agitator 80 in the hopper for preventing the powdered material from caking (see Figs. 1 and 4). The agitator 80 includes a U-shaped wire bail which is pivoted to the sides of the hopper 62 by hooks 81 on its outer ends, said hooks 81 extending through said sides and being connected outside of said hopper 62 to a pair of horizontal rods 82, which extend rearwardly along both sides of the bar 65 and the bracket 66, and are respectively connected to a pair of spaced apart pendulum arms 83 (see Fig. 4).

The pendulum arms 83 are pivotally connected to the outer rear end of the sliding bar 65, and each arm 83 is connected to a cylindrical weight 85 disposed between and held by the lower ends of said arms. By means of this construction, a swinging movement will be induced in the pendulum by the reciprocating movement of the hopper 62, and the momentum of the weight 85 will cause the wire-bail agitator to reciprocate across the die openings 19, thereby loosening any compacted material, and causing the powder to rapidly fall into the die openings and completely fill them.

It will be understood that the back-lash of the elongated slot 72 in the inclined link 67 will produce sudden starting and stopping actions of the hopper 62, and insure that the bail 80 will pass to and fro over the die openings after each stroke of the punch while the hopper 62 is in filling position above said die openings.

*Tablet ejectors*

In Figs. 1, 4, 6, 7 and 10 a plurality of vertical tablet ejecting rods 88 are shown rigidly held in a sliding ejector rod block 89, which block is secured to an ejector ram 90. The ejector rods 88 are adapted to form bottoms for the die openings 19, as well as to eject the compressed tablets 87 therefrom.

The punch block 25 and the ejector rod block 89 are both retained on the rams 26 and 90 by means of clamping plates 91 and 92 respectively. Each of the clamping plates 91, 92 is provided with a lip 93 (see Fig. 6) which overhangs shoulders 94 on the respective blocks whereby said blocks 25, 89, are clamped firmly against the respective rams 26, 90 by means of bolts 95, 95 (see Fig. 13). The lips 93 and the shoulders 94 extend across the rams 26 and 90, so that the blocks 25, 89 may be horizontally moved to bring the punches 24 and ejector 88 into alignment with the openings 19 in the die 18.

In the punch block and ram assembly, the block 25 abuts directly against the under face of the ram 26 (see Fig. 4), whereby a solid and rigid backing for the punches 24 is provided. In the ejector rod block and ram assembly, however, the block 89 lies above a central block 96 set into a transverse slot 97 which passes diametrically across the ram 90.

In order to prevent rotative movement of the ram 90 in the frame 16, provision is made of a vertically disposed key 98 (see Figs. 6 and 7), which interfits with said ram and said upper frame.

*Modified mechanism for producing perforated pellets*

Referring now to Figs. 12 and 13, provision is made of a plurality of hollow punches 99, hollow ejector rods 100, and center pins or core rods 101 for cooperating with the die openings 19 of the die 18, as described above. The center pins 101 are rigidly supported by a stationary cross-bar 102 which extends through the transverse slot 97 in the movable ejector ram 90 and is secured at each of its ends to a pair of shoulders 103, 103 formed at opposite sides of the upright members 21 and 22, as by screws 104.

The center pins 101 extend upwardly to the upper surface of the die 18 and pass through the hollow ejector rods 100 and lower ends of the hollow punches 99. By means of this construction, it will be seen that each tablet formed in the press will have a central aperture. The portion of the opening 97 below the cross-bar 102 is left vacant in this arrangement to permit the ram 90 to be moved upwardly with respect to said bar 102 to actuate the ejector rods 100.

*Ejector-ram adjusting mechanism*

The mechanism for vertically reciprocating the ejector ram 90 and through it the ejector rods 88 and for vertically adjusting said ram 90 for varying the stroke of the same in both forms of the invention will now be described. This mechanism comprises an elongated base plate 106 (see Figs. 5, 6 and 7) normally seated upon a horizontal shoulder 107 provided in the base of the upper frame 16, which base plate extends between the upright frame members 21, 22, and is adapted to be vertically moved upon guide pins 105. A horizontal bevel gear 108 mounted on a vertical axis is rotatively mounted in a central opening in the bottom of said base plate 106. The gear 108 is connected to a short hub 109 of an externally threaded cylindrical stud 110 which fits in an internally threaded opening 111 of the ejector ram 90.

Figure 5:
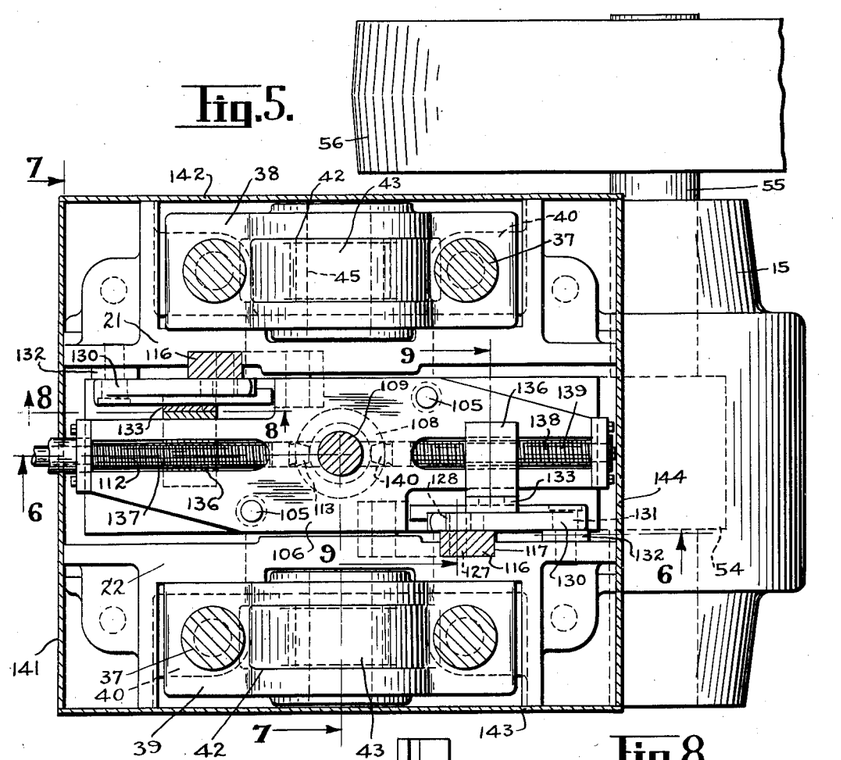
Fig. 5 is an enlarged horizontal partial sectional view taken generally on the line 5—5 of Fig. 2.

Provision is also made of a horizontal spindle 112 having a small bevel pinion 113 secured by a pin 114 to its inner end which meshes with the horizontal gear 108. The spindle 112 extends laterally through the plate 106 to a point outside the frame 16, and has a hand-wheel 115 mounted on its outer end to facilitate the manual rotation of the same. Rotation of the spindle 112 by the hand-wheel 115 will in turn rotate the stud 110 to raise and lower the ejector ram 90 by means of its operative connection therewith through the bevel gear 108 and the hub 109.

In order to drive the reciprocating ejector ram 90 from the main shaft 48, provision is made of a pair of obliquely disposed slide bars 116 (Figs. 2 and 6), one being provided on each side of the base plate 106. The bars 116 are adapted to slide in diverging inclined grooves 117 formed in the upright members 21, 22 of the upper frame 16.

To facilitate the movements of the slide bars 116, two pairs of guide rollers 118, 118 are provided for the upper ends of said slides 116,—the lower ends thereof being guided in grooves 119 formed in the lower frame 15. The slides 116 also have rollers 120 rotatably mounted on the lower ends thereof, which are arranged to ride in a pair of camming slots 121, 122 formed in the opposite side faces of the large drive gear 52. Each of the cam slots 121, 122 is formed with a gradually rising cam section 123 corresponding to the rising movement of the tablet ejector ram 90. The cam slots 121, 122 are also provided with a circular outer section 124 to produce a short "dwell" while the tablets 87 are being pushed off of the die block 17 by the hopper 62. The cam slots 121, 122 also have a steep section 125 to produce an abrupt drop corresponding to the lowering of the ejector ram 90. The remaining inner portion 126 of the cam slots 121, 122 is circular to produce a long "dwell" of the ejector rods 88 when they are at the bottom of the die openings 19 during the compression of the tablets 87 by the punches 24.

In order to cause the slide bars 116 to raise and lower the base plate 106, and by it the ejector rods 88, each slide bar 116 (Figs. 5, 6, 7, 8 and 9) has a pin 127 extending from one side thereof into a slide block 128 adapted to slide in a recess 129 formed in the side surface of a short link 130, which is pivoted at one end by a horizontal screw 131 to a boss 132 provided on the adjacent frame member 21 or 22.

Figure 9:
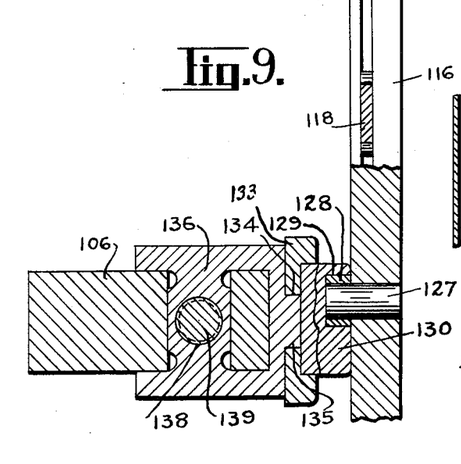
Fig. 9 is an enlarged fragmentary sectional view taken on the broken line 9—9 of Fig. 5.
Figure 10:
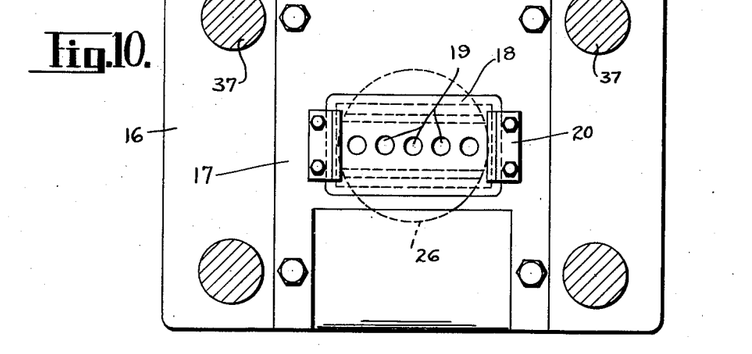
Fig. 10 is an enlarged sectional plan view of the die block taken on the line 10—10 of Fig. 1 looking downwardly.

As most clearly shown in Fig. 9, a short U-shaped block 133 straddles each link 130, and said blocks are provided with holes 134 in which are studs 135 extending from connecting blocks 136 slidably mounted on the opposite ends of the plate 106 adjacent the links 130. One of the connecting blocks 136 is threadedly engaged by the threaded portion 137 of the spindle 112, and the other block 136 is threadedly engaged by the threaded portion 138 of a similar spindle 139 disposed in the other end of the plate 106. A bevel pinion 140, similar to the pinion 113, is mounted on the inner end of the spindle 139 and meshes with the horizontal bevel gear 108, whereby the spindle 139 may be rotated in unison with the spindle 112, when the hand-wheel 115 is turned, to simultaneously move the blocks 136 in opposite directions along the plate 106 to adjust the effective position of the short links 130. The amount by which the base plate 106 is raised by the slide bars 116 may thus be varied according to the desired stroke of the ejector ram 90. This will insure the positioning of the ejector rods 88, when at the limit of their upward stroke, at the level of the upper surface of the die block 18, irrespective of the thickness or length of the tablet 87 being formed. The lowermost position of said rods 88 with respect to the punches 24 will also be adjusted simultaneously with adjustment of the stroke of said rods 88 by manipulation of the hand wheel 115, whereby the thickness of the tablets 87 may be varied at will.

For the purpose of sealing the operating parts of the machine, four flat metal sheets 141, 142, 143 and 144 are employed to completely enclose the lower part of the structure, whereby the interior operating parts of the machine will be protected against dust or powdered material. The lower machine frame 15 is also formed with a bottom 145, which with side partitions 146 (Fig. 2) forms an oil retaining pocket in which a pump (not shown) may be disposed to force oil through suitable conduits (not shown) leading to the moving parts of the machine in a well known manner. To assist in maintaining the front of the machine closed against the ingress of dust etc., a washer plate 147 (Fig. 4) is mounted on the spindle 112, and is carried thereby when the plate 106 is moved vertically up and down during its operating movements.

Figure 14:
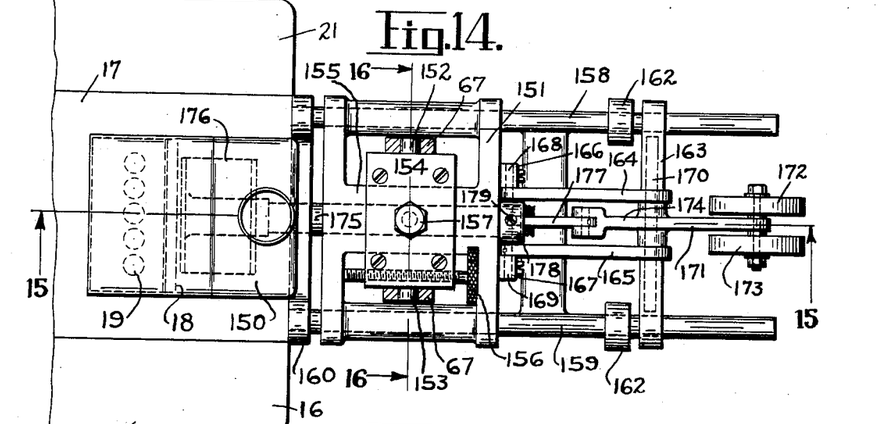
Fig. 14 is a plan view of a modified form of mechanism for agitating the powdered material.
Figures 15, 16:
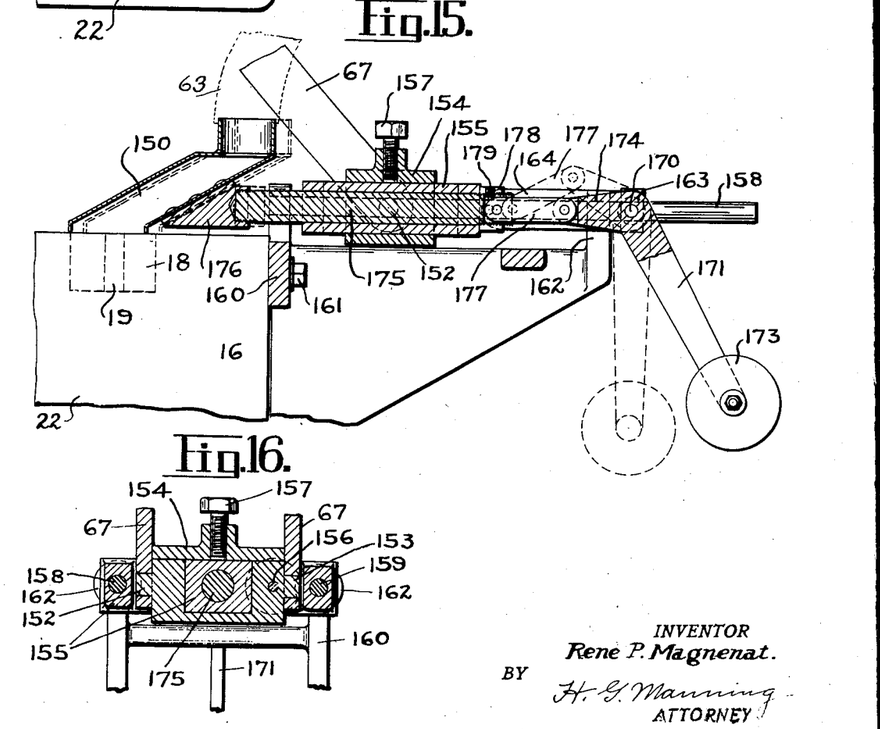
Fig. 15 is a vertical section taken on the line 15—15 of Fig. 14.
Fig. 16 is a section taken on the line 16—16 of Fig. 14.

Figs. 14–16 inclusive illustrate a modified means to agitate a reciprocable inclined hopper 150, which may be connected by a tube 63 to a source of powder supply as in the previously described form. In this modified form of the invention, the powder is loosened by shocks instead of by movements of the bail 80 as in the first form. The hopper 150 is reciprocated over the upper face of the die plate 18 by means of links 67 connected to the reciprocating head 27. The lower ends of the links 67 are adjustably connected to a slide 151 by means of trunnions 152 and 153 journaled in said slide. The trunnions 152 and 153 extend from opposite sides of a box-like member 154 which is slidably mounted upon a rectangular central portion 155 of the slide 151. The box member 154 may be longitudinally adjusted upon the central portion 155 by turning a horizontal thumb screw 156, and said box member may be rigidly clamped in its adjusted position by a vertical set screw 157.

The slide 151 is mounted upon parallel rods 158 and 159 which extend outwardly from a bracket 160 secured to the frame 16, as by screws 161. The rods 158 and 159 are supported at a point spaced from the frame 16 by a pair of upstanding lugs 162 provided at the outer end of the bracket 160. The slide 151 is connected to a cross-bar 163, slidably mounted on the rods 158 and 159 by a pair of centrally positioned parallel links 164 and 165 which are pivoted by pins 168 and 169 to lugs 166 and 167, respectively, provided on the slide 151. The links 164 and 165 are also pivotally connected to the cross-bar 163 by means of a cross-shaft 170. A bell-crank pendulum lever 171 is swingably mounted upon the shaft 170 between the links 164 and 165 and has a pair of cylindrical disc-shaped weights 172 and 173 secured upon the lower free end thereof.

In order to connect the bell-crank lever 171 with the hopper 150, a short arm 174 is provided upon the lever 171 and extends from the shaft 170 toward said hopper, which is preferably secured to one end of a cylindrical bar 175 by a bracket 176, and the bar 175 extends from the hopper 150 through the central portion 155 of the slide 151 within which it is freely slidable. The bar 175 is connected to the short arm 174 of the bell-crank lever 171 by a link 177 which is pivotally secured at each of its ends to the arm 174 and the bar 175, respectively. A tapped collar 178 is screwed upon the protruding end of the bar 175 and may be clamped in any desired adjusted position by a set screw 179. The connection constituted by the link 177 and the short arm 174 constitutes a "toggle" joint between the bell-crank pendulum lever 171 and the bar 175.

*Operation*

In operation, after the proper die 18 has been assembled in the die block 17, the punch block 25 will be adjusted vertically to the desired point by means of the hand-wheel 35. The ejector block 89 will likewise be adjusted as desired by turning the hand-wheel 115. The ejector rods 88 will form the bottoms for the die openings 19 during the punching process and will thereafter be raised to bring their upper ends to the level of the upper surface of the die 18 to eject the tablets. A standard length of ejector rod 88 will preferably be used for all sizes of tablets.

It will be understood that one of the camming slots 121 and 122 will be advanced angularly with respect to the other due to the spacing apart of the slides 116, so that the lifting action of the gradual rise sections 123 of said camming slots will occur simultaneously upon the slides 116. This will cause the plate 106 and the ejector ram 90 to rise and to eject the formed tablets 87 just before the horizontal head 27 carrying the punches 24 reaches its limit of upward stroke. The dwell occasioned by the outermost camming slot section 124 is sufficiently long to permit complete vertical ejection of the tablets 87 as above described, and also permits of a slight downward movement of the horizontal head 27 and a rearward movement of the hopper 62 to take place. The abrupt drop occasioned by the camming slot section 125 disposes the ejector rods 88 in their normal bottom position with the base plate 106 resting on the shoulder 107,—the rods 88, ram 90, stud 110 and plate 106 being thus rigidly supported by the upper frame 16 and insuring a solid and firm abutment against which the punches 24 may act to compress the powdered material in the dies into solid tablets 87. During the forward and backward movement of the hopper 62 as above described, which occurs in timed relation between the strokes of the punches 24 and the ejector rods 88, the wire agitator bail 80 will be swung to and fro across the die openings 19 by the pendulum action of the arms 83 and the weight 85,—thus insuring the complete filling of the die openings with the powdered material.

While the machine is in operation, the base plate 106 will be alternately moved from its full line position to the dotted line position and back again, as shown in Fig. 6, this movement being caused by the swinging of the links 130 upwardly by the slides 116. This is due to the connection of said links 130 to the pins 127 and also to the connection between the links 130 and the plate 106 by the spindle moved blocks 136 and the studs 135.

Figure 8:
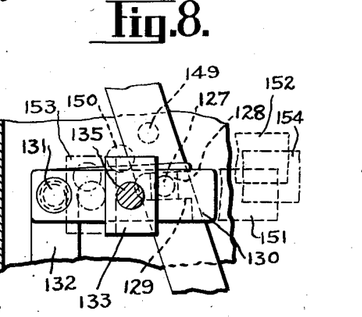
Fig. 8 is a fragmentary sectional view taken on the line 8—8 of Fig. 5, illustrating the relationship of the parts of the ejector mechanism in various adjusted positions.

It will also be understood by referring to Fig. 8 that the pins 127 and slide blocks 128 will move upwardly with the slide 116 as far as permitted by the rise section 123 of the camming slots 121 and 122,—the amount of said upward movement of the blocks 133, 136 controlled by the position of the link 130 and in respect to the pivot point of the screw 131. As illustrated in with respect to the screw 131. As illustrated in Fig. 8, at each stroke of the press (or revolution of the gear 52) the pin 127 will rise to the position indicated by the numeral 149. The stud 135 and the blocks 133, 136, however, will move only from the full line position shown in said figure to a point 150 indicated by dotted lines, causing the base plate 106 to be raised, and with it the ejector rods 88, from the dotted line position 151 to the dotted line position 152. By adjusting the blocks 133, 136 and the stud 135 into the dot-and-dash line position indicated at 153, the plate 106 will be raised only to the dot-and-dash line position indicated at 154 due to the shortening of the leverage distance between the stud 135 and the arm pivot at 131.

In the use of the modified form of the powder agitating mechanism shown in Figs. 14-16, the hopper will be moved across the die plate 18 by the reciprocation of the head 27 due to the connecting link 67. During its forward movement, (to wit: toward the left in Fig. 15) the hopper 150 will assume the position shown in full lines, and the pendulum lever 171 with the weights 172, 173 due to inertia will move to the right, as also shown in full lines,—this action serving to suddenly push the hopper still farther to the left beyond its normal reciprocating movement. As soon as this left stroke is completed, the pendulum arm 171 and the weights 172, 173 will fall to the dotted position shown in Fig. 15 drawing the hopper slightly backward (to the right). The hopper 150 will thus be abruptly shaken causing the powder therein to be loosened, and thus insuring a complete filling of the die openings 19 with said powder.

One advantage of the present invention is that the centrally disposed driving gear which has camming slots in its opposite faces and the oppositely disposed crank links 44 and slides 116, produces a balanced mechanism which is capable of withstanding comparatively heavy stresses without occasioning vibration or uneven operation. The use of the machine herein disclosed will result in a material increase in production of tablets of any size or form, and since adjustments may be made without disassembling the machine, shut downs for repairs and adjustment, or for changing the size of tablets will be reduced to the minimum.

While there have been disclosed in this specification several forms in which the invention may be embodied, it is to be understood that these forms are shown for the purpose of illustration only, and that the invention is not to be limited to the specific disclosures, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a tablet making machine, a die, a punch adapted to enter said die, means to reciprocate said punch into and out of said die, a hopper containing powdered material having a bottom opening therein adapted to slide over said die, means to move said hopper over the die to permit material to drop therefrom into said die between successive strokes of said punch, said hopper being driven by the reciprocating movement of said punch, and swinging pendulum means actuated by the movement of the hopper and connected to said hopper for automatically agitating it.

2. In a tablet making machine, a die, a punch adapted to enter said die, means to reciprocate said punch into and out of said die, a hopper containing powdered material having a bottom opening therein adapted to slide over said die, means to move said hopper over the die to permit material to drop therefrom into said die between successive strokes of said punch, said hopper being driven by the movement of said punch, and swinging pendulum means actuated by the movement of the hopper and connected to said hopper for automatically agitating it, said pendulum means being connected to said hopper by a loose toggle joint.

3. In a tablet making machine, a die having an opening therethrough, a reciprocable punch adapted to enter the die opening from the top thereof, a reciprocable ejector rod in said die opening and adapted to serve as the bottom thereof, mechanism for reciprocating said punch to compress powdered material within the die opening into tablet form including a driven shaft, means connected with said shaft to reciprocate said punch, a second means connected with said shaft without lost motion for subsequently driving said ejector rod upwardly to eject said tablet and to move said rod downwardly at all adjustments, and means to adjust the length of stroke of said ejector rod so that it will be flush with the top of said die after the tablet has been ejected irrespective of the depth of said tablet.

4. In a tablet making machine, a die having an opening therethrough, a reciprocable punch adapted to enter the die opening from the top thereof, a reciprocable ejector rod adapted to enter the die opening from the bottom and adapted to serve as the bottom of said die opening, mechanism for reciprocating said punch to compress powdered material within the die opening into tablet form including a driven shaft, means connected with said shaft to reciprocate said punch, a second means connected with said shaft for subsequently driving said ejector rod upwardly to eject said tablet, means to adjust the height of said punch, and other means to adjust the position of said ejector rod at the bottom of its stroke to control the size and compression of said tablet without lost motion in the stroke thereof.

5. In a tablet making machine, a punch, a die having an opening therethrough shaped to fit said punch, an ejector rod adapted to form the bottom of said die opening, means to raise said ejector rod to eject the tablet after the downward stroke of said punch, and common means to simultaneously adjust the length of the stroke of the ejector rod and its bottom position in said die opening and without changing the dwell period of the rod while it is flush with the die.

6. In a tablet making machine, a die, a punch adapted to enter said die, means to reciprocate said punch into and out of said die, a hopper containing powdered material having a bottom opening therein adapted to slide over said die, means to move said hopper over the die to permit material to drop therefrom into said die between successive strokes of said punch, said hopper being driven by the reciprocating movement of said punch, an agitator member in said hopper swingably movable across the die opening, and pendulum means swingable by the motion of said hopper to vibrate said agitating means.

7. In a tablet making machine, a die, an ejector rod adapted to form a base for said die, means to reciprocate said rod including a rotatable cam member disposed below said die, a vertically movable base plate carrying said rod, a slide member operatively connected to said cam member, a pivoted arm connecting said slide member and said base plate, and means to adjust the position of said ejector rod in said die, means to adjust the connection between said arm and said base plate to vary the length of the vertical stroke of said base plate so that said ejector rods will be flush with the dies after ejection of the tablets, and common means to simultaneously adjust both of said adjustable means.

8. In a tablet making machine, a die, an ejector rod adapted to form a base for said die, means to reciprocate said rod including a rotatable cam member disposed below said die, a vertically movable base plate carrying said rod, a slide member operatively connected to said cam member, a pivoted arm connecting said slide member and said base plate, and means to vary the position of said ejector rod in said die.

9. In a tablet making machine, a die, an ejector rod adapted to form a base for said die, means to reciprocate said rod including a rotatable cam member disposed below said die, a vertically movable base plate carrying said rod, a slide member operatively connected to said cam member, a pivoted arm connecting said slide member and said base plate, means to vary the position of said ejector rod in said die, and means to adjust the connection between said arm and said base plate to vary the length of the vertical stroke of said base plate so that said ejector rods will be flush with the dies after ejection of the tablets.

10. In a multiple tablet making machine, a die block containing a plurality of dies, a punch block containing a plurality of punches fitting said dies, an ejector block having a plurality of ejector rods fitting said dies and serving to form the bottoms of the die openings during the tablet compressing operation, means disposed below said dies to reciprocate said punch block while said ejector block and rods remain stationary to compress powdered material in said dies into tablets, cam means associated with said reciprocating means and disposed below said die to subsequently lift said ejector block to bring said ejector rods flush with the tops of said dies and eject said tablets, and to then retract said ejector rod downwardly without lost motion.

11. In a tablet making machine, a frame, a pair of spaced upright members supported by said frame, a stationary die block supported by said upright members, a vertically slidable ejector rod block supported by said frame between said upright members and in vertical alignment with said die block, a plurality of vertical tie rods slidable in said upright members, a horizontal head carried by the upper ends of said tie rods, a punch block supported by said head and carrying a punch in alignment with the die in said die block, and means disposed below said die to hold said ejector rod stationary while the punch is moving downwardly to compress the tablet in said die, and means comprising a plurality of telescoping tubular sections containing a coiled spring reacting between said frame and said head to press said head upwardly.

12. In a tablet making machine, a frame, a pair of spaced upright members supported by said frame, a stationary die block supported by said upright members, a vertically slidable ejector rod block supported by said frame between said upright members and in vertical alignment with said die block, a plurality of vertical tie rods slidable in said upright members, a horizontal head carried by the upper ends of said tie rods, a punch block supported by said head and carrying a punch in alignment with the die in said die block, means disposed below said die to hold said ejector rod stationary while the punch is moving downwardly to compress the tablet in said die, and a common source of power in said frame below said die block for driving said punch block and said ejector rod block in proper synchronism.

13. In a tablet making machine, a stationary die, a punch carrying block above said die, a slidable head carrying said block, said block having a threaded sleeve adjustably screwed into said head, a gear fixed to said sleeve, and a manually operated pinion meshing with said gear to adjust the position of said sleeve and block with respect to said head.

14. In a tablet making machine, a stationary die, a punch carrying block above said die, an ejector-rod carrying block located below said die, means to reciprocate said blocks with respect to said die, a horizontal hopper member containing powdered material slidable upon said die, said hopper having an open bottom, means driven by the block reciprocating means to reciprocate said hopper across said die between the strokes of said punch block, said hopper member serving to push the tablets after ejection by said ejector rods off said die, said hopper reciprocating means including an inclined link having a lost-motion connection with said block reciprocating means and an adjustable pivotal connection with said hopper member.

15. In a tablet making machine, a stationary die, a punch carrying block above said die, an ejector-rod carrying block located below said die, means to reciprocate said blocks with respect to said die, a horizontal hopper member containing powdered material slidable upon said die, said hopper having an open bottom, means driven by the block reciprocating means to reciprocate said hopper across said die between the strokes of said punch block, said hopper member serving to push the tablets after ejection by said ejector rods off said die, and a freely swingable powder agitator located therewithin to facilitate the filling of said die from said hopper, said agitator including a pivotally mounted wire bail, and a freely swingable pendulum to swing said bail whenever the open bottom of said hopper lies over said die.

16. In a tablet making machine, a frame, a stationary die supported by said frame, a reciprocating punch movable into said die from above, a reciprocating ejector rod in said die, a slidable block for carrying said ejector rod, a horizontal driven shaft in the base of said frame, a cam carried by said shaft, a vertically slidable ram carrying said block, a vertically movable base plate having adjustable connection with said ram, said base plate having a pair of opposed inclined guide slots, a pair of inclined cam operated slide bars located in said slots, the lower ends of said slide bars engaging said cam whereby said base plate ram and ejector rod block will be successively raised and lowered.

17. In a tablet making machine, a frame, a stationary die supported by said frame, a reciprocating punch movable into said die from above, a reciprocating ejector rod in said die, a slidable block for carrying said ejector rod, a horizontal driven shaft in the base of said frame, a cam carried by said shaft, a vertically slidable ram carrying said block, a vertically movable base plate having adjustable connection with said ram, said base plate having a pair of opposed inclined guide slots, a pair of inclined cam operated slide bars located in said slots, the lower ends of said slide bars engaging said cam whereby said base plate ram and ejector rod block will be successively raised and lowered, and adjustable means extending outside said frame for manually controlling the length of the up and down strokes of said base plate, ram and ejector rod.

18. In a tablet making machine, a frame, a stationary die supported by said frame, a reciprocating punch movable into said die from above, a reciprocating ejector rod in said die, a slidable block for carrying said ejector rod, a horizontal driven shaft in the base of said frame, a cam carried by said shaft, a vertically slidable ram carrying said block, a vertically movable base plate having adjustable connection with said ram, said base plate having a pair of opposed inclined guide slots, a pair of inclined cam operated slide bars located in said slots, the lower ends of said slide bars engaging said cam whereby said base plate ram and ejector rod block will be successively raised and lowered, said slide bars being adjustably connected to said base plate by slidable blocks and link members.

19. In a tablet making machine, an enclosed frame, a stationary die, a reciprocating punch movable into said die from above, a reciprocating ejector rod movable into said die from below, means to hold said ejector rod stationary to form the bottom of said die during the punching operation, separate means extending outside said frame for adjusting the height of said punch from the die and the stationary bottom position of said ejector rod, the top of said ejector rod lying flush with the surface of said die at the top of the stroke of said rod.

20. In a tablet making machine, a die, a punch carrying block above said die and movable with respect thereto, an ejector, a horizontally movable open-bottom hopper member slidable upon said die between successive strokes of said block, said hopper member serving to push the tablets after ejection away from said die, and weight and inertia-operated means for agitating said hopper to loosen the powder therein.

21. In a tablet making machine, a vertically reciprocable punch, a stationary die, a vertically movable ejector rod, rotatable means driven by a source of power and disposed below said die and ejector rod for reciprocating said punch and moving said ejector rod, said means including a single shaft having a crank portion thereon connected to said punch for reciprocating it, and a cam thereon operably connected to said ejector rod for moving it.

RENÉ P. MAGNENAT.